United States Patent
Chavez et al.

(10) Patent No.: US 10,989,355 B2
(45) Date of Patent: Apr. 27, 2021

(54) MODULAR MOUNTING SYSTEM

(71) Applicant: Archon Firearms, Las Vegas, NV (US)

(72) Inventors: Adrian C. Chavez, Las Vegas, NV (US); Dmitry Streshinskiy, Paris (FR)

(73) Assignee: Archon Firearms, Las Vegas, NV (US)

( * ) Notice: Subject to any disclaimer, the term of this patent is extended or adjusted under 35 U.S.C. 154(b) by 0 days.

(21) Appl. No.: 16/509,368

(22) Filed: Jul. 11, 2019

(65) Prior Publication Data

US 2020/0232601 A1  Jul. 23, 2020

(30) Foreign Application Priority Data

Jan. 22, 2019 (FR) .................................. 1900560

(51) Int. Cl.
*F16M 13/04* (2006.01)
*F16M 11/04* (2006.01)

(52) U.S. Cl.
CPC .......... *F16M 13/04* (2013.01); *F16M 11/041* (2013.01)

(58) Field of Classification Search
CPC ............................ F16M 13/04; F16M 11/041
USPC ................................................. 403/331, 381
See application file for complete search history.

(56) References Cited

U.S. PATENT DOCUMENTS

| 4,087,141 A * | 5/1978 | Roberts | A47B 95/02 16/412 |
|---|---|---|---|
| 5,402,553 A * | 4/1995 | Goetz | E05B 1/0015 16/413 |
| 6,811,348 B1 * | 11/2004 | Meyer | A42B 3/04 403/325 |
| 8,522,468 B2 * | 9/2013 | Webber | F41C 7/02 42/75.03 |
| 8,656,622 B2 * | 2/2014 | Peterson | F41A 11/02 42/75.03 |
| 8,732,910 B1 * | 5/2014 | Paul | F25D 23/028 16/413 |
| 8,801,324 B2 * | 8/2014 | Kempf | H02G 1/06 403/340 |
| 9,091,505 B1 * | 7/2015 | Battaglia | F41C 23/20 |
| 2005/0215092 A1 * | 9/2005 | Schoppman | F41C 23/20 439/101 |

(Continued)

FOREIGN PATENT DOCUMENTS

| CN | 2171880 Y | 7/1994 |
|---|---|---|
| FR | 2798969 | 3/2001 |
| WO | WO-2005083349 | 9/2005 |

OTHER PUBLICATIONS

"Search Report", FR Application No. 1900560, dated Oct. 23, 2019, 13 pages.

(Continued)

*Primary Examiner* — Hahn V Tran
(74) *Attorney, Agent, or Firm* — FIG. 1 Patents

(57) ABSTRACT

An accessory mounting plate for a modular mounting system is described. The accessory mounting plate allows screwless coupling with a mounting receptacle, and may be configured to support a variety of different accessories. In one example, an accessory mounting plate includes a main body, a screwless attachment aperture, and a dovetail structure. The screwless attachment aperture is configured to enable the main body to be screwlessly mounted to a mounting receptacle. The dovetail structure is configured to enable the main body to fictively engage the mounting receptacle.

20 Claims, 10 Drawing Sheets

(56) References Cited

U.S. PATENT DOCUMENTS

| | | | |
|---|---|---|---|
| 2006/0088377 A1* | 4/2006 | Rejman | B25F 5/02 |
| | | | 403/331 |
| 2006/0133893 A1* | 6/2006 | Harashima | F16B 13/0891 |
| | | | 403/331 |
| 2009/0028631 A1* | 1/2009 | Chuang | F16M 11/041 |
| | | | 403/49 |
| 2020/0103196 A1* | 4/2020 | Keller | F16M 11/242 |

OTHER PUBLICATIONS

"Extended European Search Report", EP Application No. 20152836.1, dated Feb. 21, 2020, 7 pages.

* cited by examiner

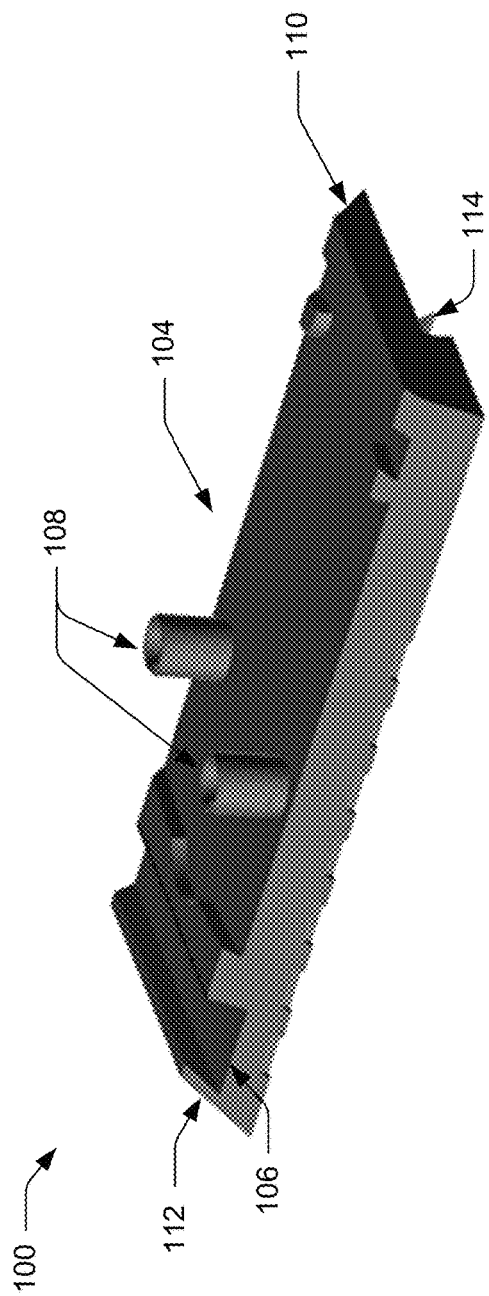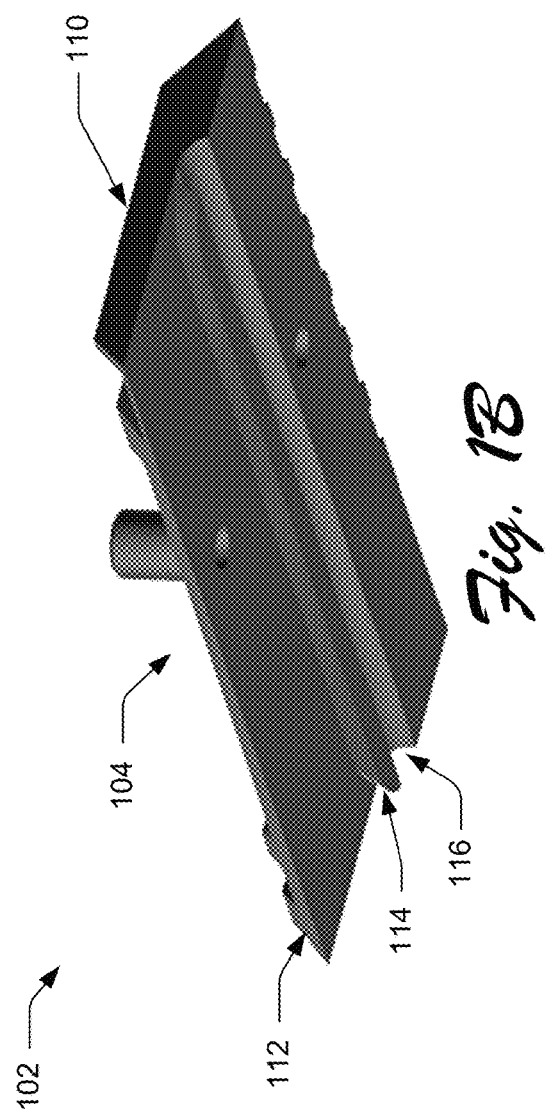

MODULAR MOUNTING SYSTEM

RELATED APPLICATION

This application claims priority under 35 U.S.C. § 119 to the French Patent Application Serial No. FR1900560, filed with the Institut National De La Propriété Industrielle on Jan. 22, 2019, entitled "Modular Mounting System", the disclosure of which is hereby incorporated by reference herein in its entirety.

BACKGROUND

Accessories such as optic assemblies often require precise alignment when attached to a mounting receptacle. Thus, attaching or changing an accessory such as an optic assembly requires a user to perform tasks pertaining to alignment or 'zeroing' of the optic assembly as part of or in addition to tasks required to attach the optic assembly. Further, accessories are available in a variety of forms, and may involve different attachment configurations requiring a variety of tools. Even within a particular category of optic assemblies, different models of optic assemblies may utilize different attachment mechanisms, be sized to accommodate different footprints, include different configurations of attachment points, and so forth. Accordingly, changing an accessory is not trivial or convenient.

Conventional techniques to change an accessory attached to a mounting receptacle include milling the mounting receptacle to provide holes for directly inserting screws through the accessory and into the mounting receptacle. These techniques pose a level of a risk and inconvenience in requiring a consumer to machine the mounting receptacle, allow for no interchangeability between different accessories, and require specialized tools and skillsets to perform. Other conventional techniques include milling a plate to be screwed onto the mounting receptacle, and attaching an accessory to the plate. Although these techniques offer some amount of interchangeability, they similarly require specialized tools and skillsets to perform.

Further, common applications for accessories such as optic assemblies involve high amounts of vibration, leading to the use of adhesives which causes a further decrease in interchangeability, and frequently leads to users damaging the mounting receptacle while attempting to remove adhesive. Accordingly, conventional techniques to change an accessory are inaccessible to many consumers, requiring specialized tools in a workshop setting that may involve expensive customized additional parts, and thus even if available are generally avoided by consumers.

SUMMARY

An accessory mounting plate for a modular mounting system is described. In one example, an accessory mounting plate includes a main body, a screwless attachment aperture, and a dovetail structure. The screwless attachment aperture is configured to enable the main body to be screwlessly mounted to a mounting receptacle. The dovetail structure is configured to enable the main body to fictively engage the mounting receptacle.

In another example, an accessory mounting plate is formed from a main body having an upper surface and a lower surface. The upper surface has a structure configured to enable an accessory to be mounted thereon, and a first dovetail configured to engage with a first recess in a mounting receptacle. The lower surface has a second dovetail configured to engage with a second recess in the mounting receptacle, and a channel configured to receive a pin for screwless coupling of the accessory and the mounting receptacle.

In a further example, a system includes a mounting receptacle, a plurality of accessory mounting plates, and a pin. The mounting receptacle has a mounting structure configured to enable the accessory mounting plate to be screwlessly mounted on the mounting structure. The mounting structure includes a recess configured to engage with an accessory mounting plate dovetail, and a channel configured to receive the pin. Each respective one of the plurality of accessory mounting plates includes a dovetail configured to fictively engage the recess of the mounting receptacle, and a channel configured to receive the pin. The pin is configured to screwlessly couple the mounting receptacle and a respective one of the accessory mounting plates by fictively engaging the channel of the mounting receptacle and the channel of the respective accessory mounting plate.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIG. 1A depicts an isometric view of an accessory mounting plate.

FIG. 1B depicts an isometric view of an accessory mounting plate.

DETAILED DESCRIPTION

Figure 2A:
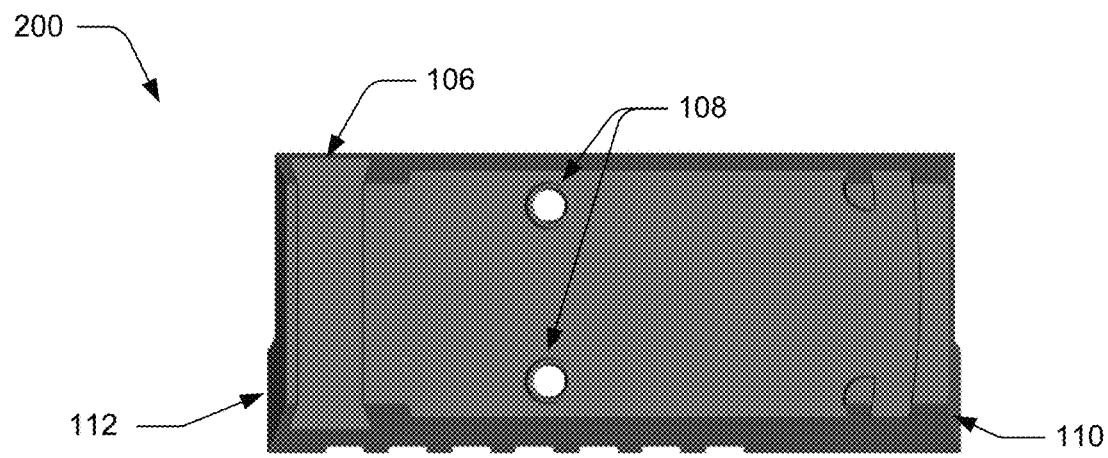
FIG. 2A depicts a top view of the accessory mounting plate of FIG. 1.

FIGS. 1A and 1B depict isometric views 100 and 102, respectively, of an accessory mounting plate 104. The accessory mounting plate 104 includes a structure to enable mounting of an accessory (e.g., an optic assembly), such as a dovetailed channel 106 or tapped holes 108. The structure to enable mounting of an accessory may be, for instance, specific to a particular model of accessory including particular mechanisms and dimensions to suitably interface with corresponding features of the accessory. The accessory mounting plate 104 further includes dovetails 110, 112, and 114 configured to engage with recesses in a mounting receptacle as further described with respect to FIG. 6, and a channel 116 configured to receive a pin for screwless coupling of the accessory mounting plate 104 with the mounting receptacle as further described with respect to FIG. 8.

Figure 2B:
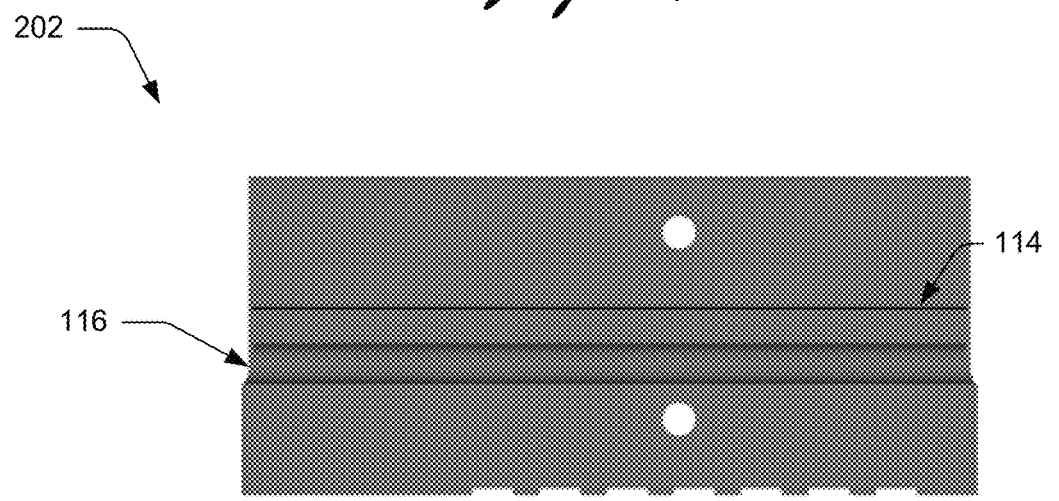
FIG. 2B depicts a bottom view of the accessory mounting plate of FIG. 1.
Figure 2C:
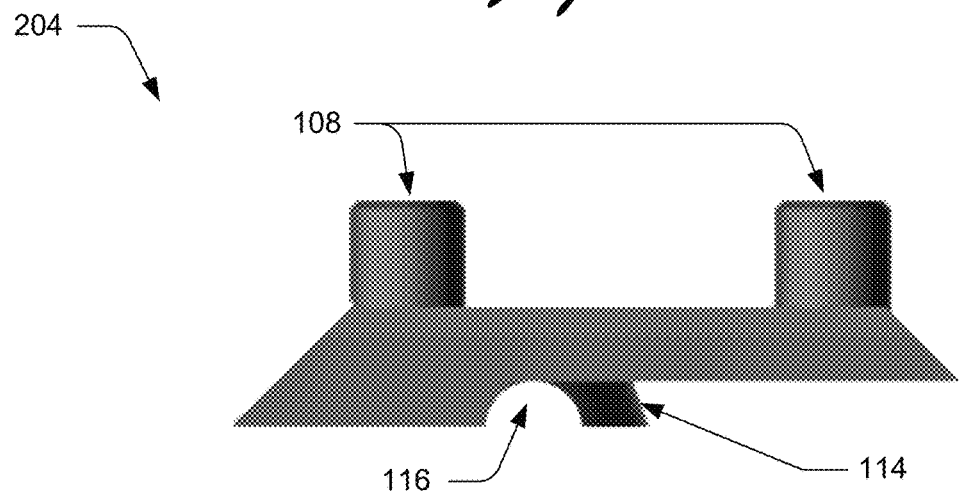
FIG. 2C depicts a front view of the accessory mounting plate of FIG. 1.

FIGS. 2A-2C depict various views of the accessory mounting plate 104. FIG. 2A depicts a top view 200 of the accessory mounting plate 104 of FIG. 1 and illustrates the dovetailed channel 106, the tapped holes 108, and the dovetails 110 and 112. FIG. 2B depicts a bottom view 202 of the accessory mounting plate 104 of FIG. 1 and illustrates the dovetail 114 and the channel 116. FIG. 2C depicts a rear view 204 of the accessory mounting plate 104 of FIG. 1 and illustrates the tapped holes 108, the dovetail 114, and the channel 116.

Figure 3A:
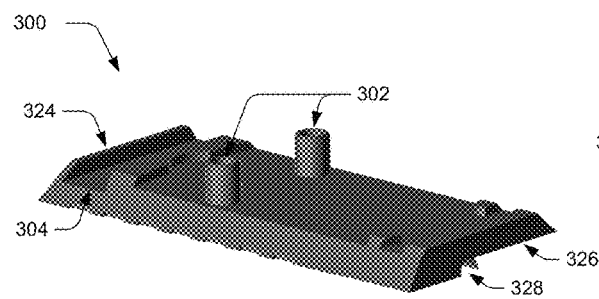
FIG. 3A depicts an isometric view of different respective accessory mounting plates.
Figure 3B:
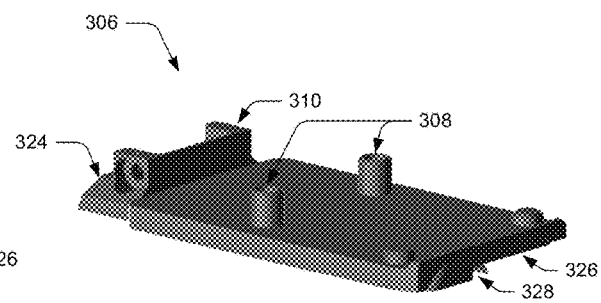
FIG. 3B depicts an isometric view of different respective accessory mounting plates.
Figure 3C:
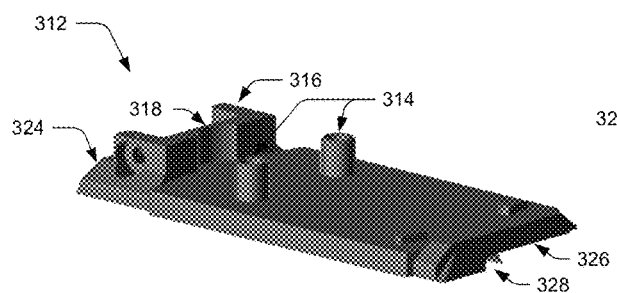
FIG. 3C depicts an isometric view of different respective accessory mounting plates.
Figure 3D:
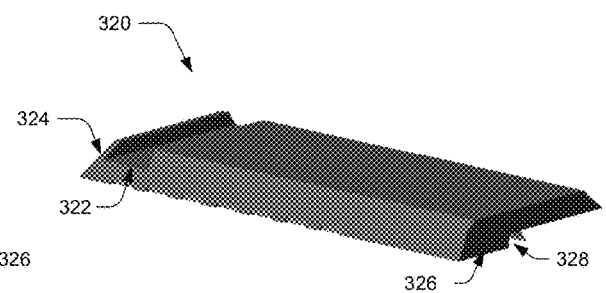
FIG. 3D depicts an isometric view of different respective accessory mounting plates.

FIGS. 3A-3D depict different example configurations of accessory mounting plates. FIG. 3A depicts an accessory mounting plate 300. The accessory mounting plate 300 includes tapped holes 302 and a dovetailed channel 304 configured to interface with a particular accessory. FIG. 3B depicts an accessory mounting plate 306. The accessory mounting plate 306 includes tapped holes 308 and a mounting system 310 configured to interface with a different particular accessory. FIG. 3C depicts an accessory mounting plate 312. The accessory mounting plate 312 includes tapped holes 314 and a mounting system 316 configured to interface with yet another different particular accessory. Although containing generally similar elements, the accessory mounting plate 312 differs from the accessory mounting plate 306, such as through inclusion of an indentation 318 in the mounting system 316 and through a different spacing between the mounting system 316 and the tapped holes 314 as compared to the spacing between the mounting system 310 and the tapped holes 308. FIG. 3D depicts an accessory mounting plate 320. The accessory mounting plate 320 includes a dovetailed channel 322 configured to interface with yet another particular accessory. It is to be appreciated that any number of accessory mounting plates may be configured with a variety of different structures to enable mounting of accessories.

Further, an accessory mounting plate does not require any structure to interface with an accessory. For instance, an accessory mounting plate may include a smooth and plain upper surface configured for use without an accessory. This may be desirable, for instance, when a user does not wish to use any accessory with a mounting receptacle but wants to protect the recesses and dovetails of the mounting receptacle, such as to prevent exposed edges within a recess of the mounting receptacle from catching or injuring a user's hand.

Each of the accessory mounting plates 300, 306, 312, and 320 include uniform dovetails to enable interchangeability. As depicted in FIGS. 3A-3D, each of the accessory mounting plates 300, 306, 312, and 320 include corresponding dovetails 324 and 326, such that each of the respective accessory mounting plates may be mounted to a uniform recess of a mounting receptacle. Further, each of the accessory mounting plates 300, 306, 312, and 320 include a corresponding channel 328 configured to receive a pin for screwless coupling of the accessory mounting plate 104 with the mounting receptacle.

Figure 4:
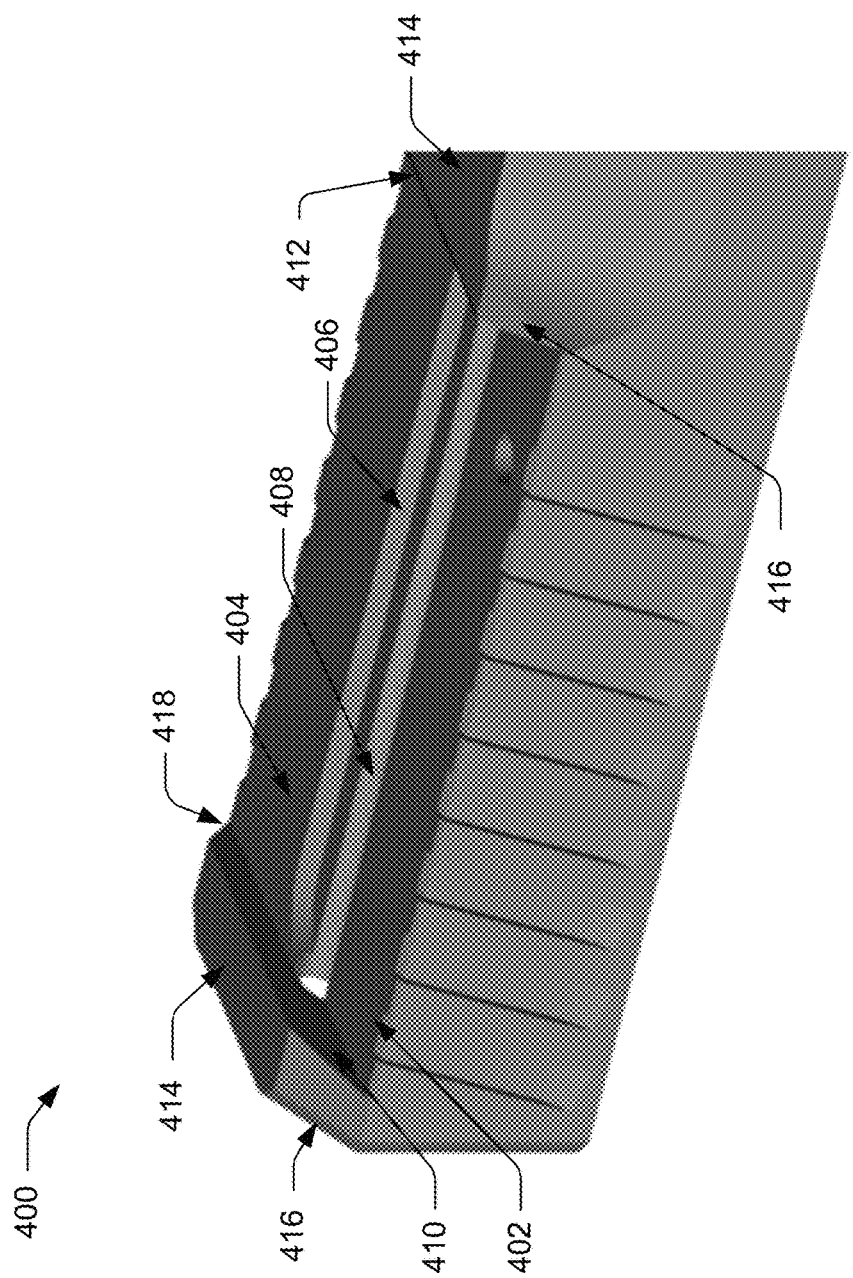
FIG. 4 depicts an isometric view of a mounting receptacle.

FIG. 4 depicts an isometric view of a mounting receptacle 400. The mounting receptacle 400 includes a number of features that partially bound a recess configured to receive an accessory mounting plate. As depicted, the mounting receptacle 400 includes a bottom portion 402, a bottom portion 404, and a dovetail 406. The bottom portions 402 and 404 may be substantially parallel but occupy different planes, such as by being vertically offset according to a height of the dovetail 406. A channel 408 is included within the bottom portion 402, such that the bottom portion 402 may be divided into multiple areas. Further, the mounting receptacle 400 includes dovetails 410 and 412. Each of the bottom portion 402, the bottom portion 404, the dovetail 406, the channel 408, and the dovetails 410 and 412 partially define a recess in the mounting receptacle 400.

The mounting receptacle 400 further includes top portions 414, edge portions 416, and edge portions 418. The top portion 414 and the edge portions 416 and 418 are each disposed along different respective planes generally defining an external surface of the mounting receptacle 400. The recess is further defined by these respective planes, such that the bounds of the recess may be visualized as extensions of the top portions 414, the edge portions 416, and the edge portions 418. Thus, an object generally sized and shaped according to the bounds of the recess, when combined with the mounting receptacle 400, substantially appears to provide a continuous top portion 414, a continuous edge portion 416, and a continuous edge portion 418.

Figure 5A:
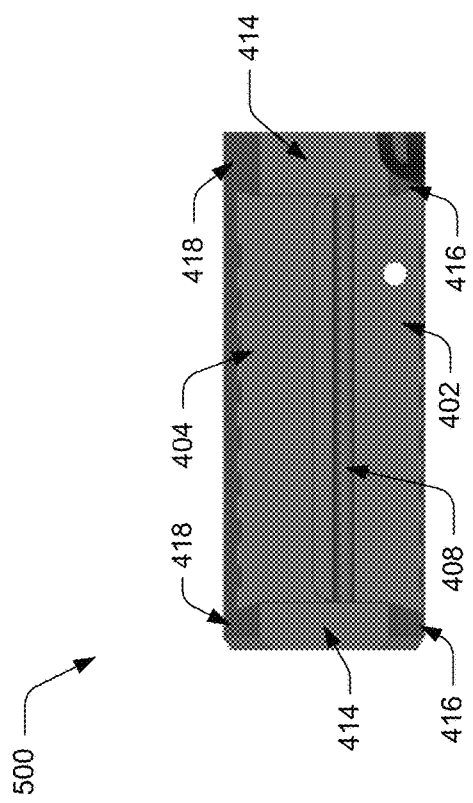
FIG. 5A depicts a top view of the mounting receptacle of FIG. 4.
Figure 5B:
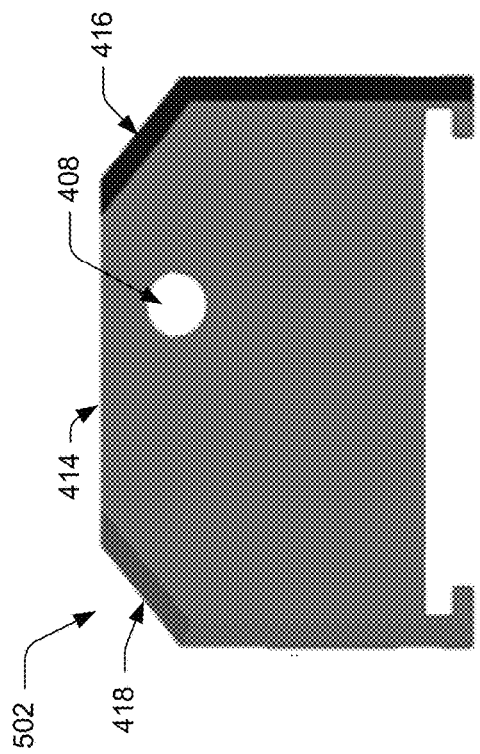
FIG. 5B depicts a rear view of the mounting receptacle of FIG. 4.
Figure 5C:
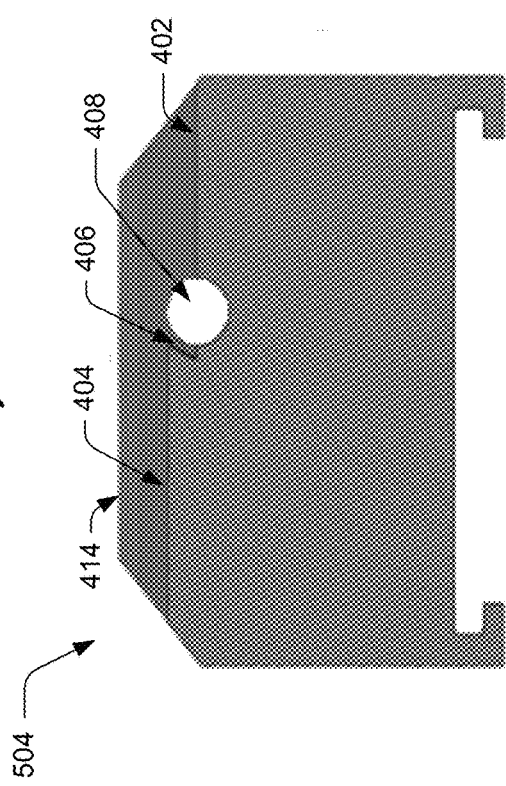
FIG. 5C depicts a rear view of the mounting receptacle of FIG. 4.
Figure 5D:
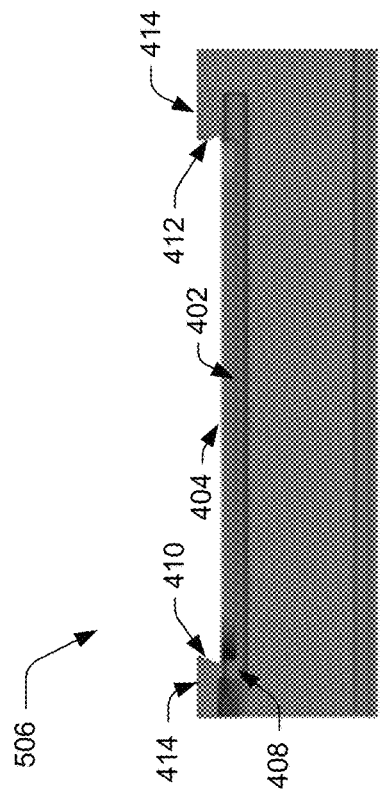
FIG. 5D depicts a side cross-sectional view of the mounting receptacle of FIG. 4.

FIGS. 5A-5D depict various views of the mounting receptacle 400. FIG. 5A depicts a top view 500 of the mounting receptacle 400 and illustrates the bottom portions 402 and 404, the channel 408, the top portions 414, and the edge portions 416 and 418. FIG. 5B depicts a rear view 502 of the mounting receptacle 400, and illustrates the channel 408, the top portion 414, and the edge portions 416 and 418. FIG. 5C depicts a cross-sectional view 504 of the mounting receptacle 400 from a rear view, and illustrates the bottom portions 402 and 404, the dovetail 406, the channel 408, and the top portion 414. FIG. 5D depicts a cross-sectional view 506 of the mounting receptacle 400 from a side view, and illustrates the bottom portions 402 and 404, the channel 408, the dovetails 410 and 412, and the top portions 414.

In some implementations, the mounting receptacle 400 is a slide or a rail system. In those examples, the accessory mounting plate techniques described herein allow an accessory, or multiple different accessories, to be retrofitted onto the slide or rail system in an interchangeable manner without requiring a user to machine or otherwise alter the slide or rail system.

Figure 6:
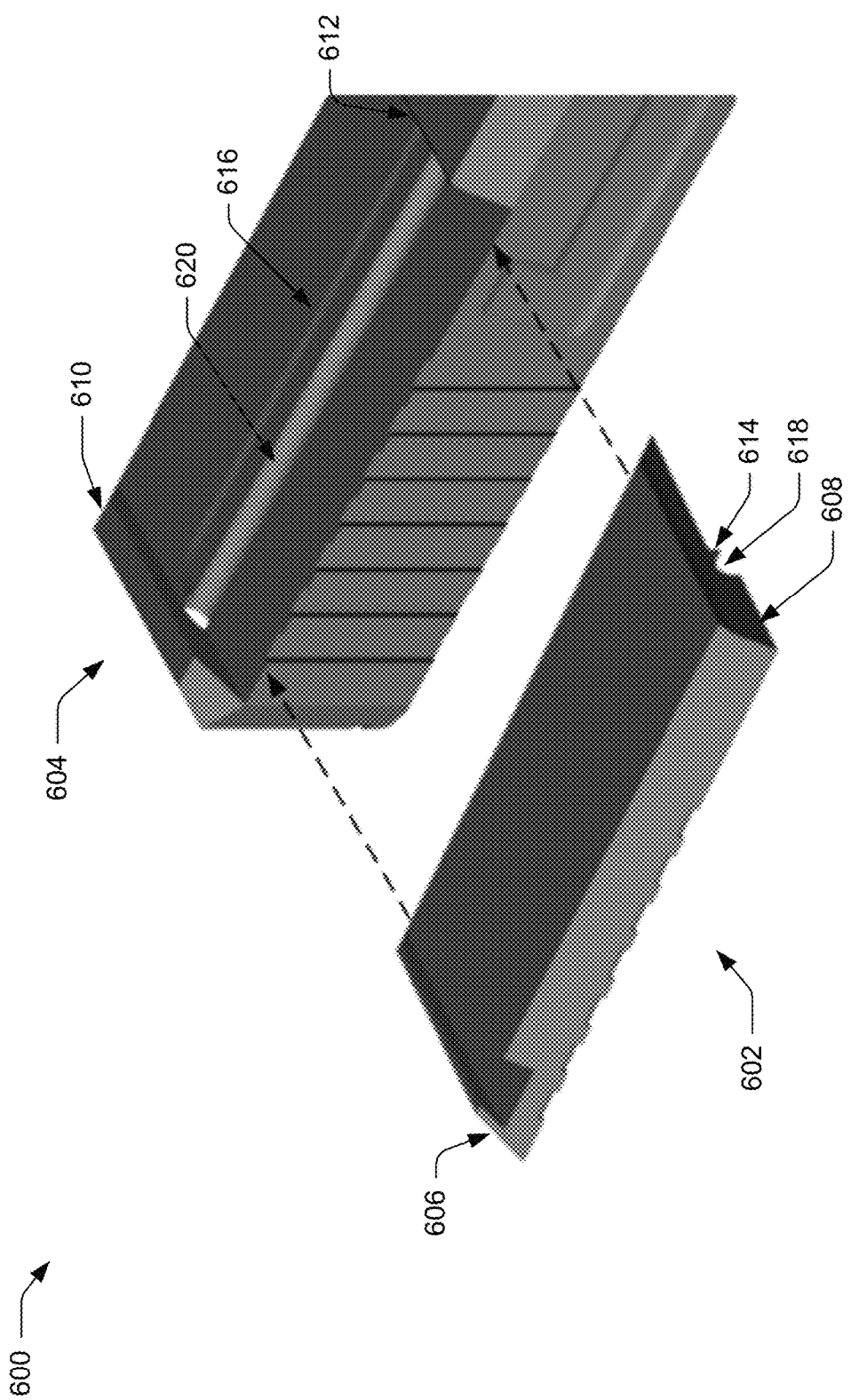
FIG. 6 depicts an example scenario in which an accessory mounting plate is inserted into a mounting receptacle.

FIG. 6 depicts an example scenario 600 in which an accessory mounting plate 602 is inserted into a mounting receptacle 604. The accessory mounting plate 602 includes dovetails 606 and 608, which correspond to dovetails 610 and 612, respectively, of the mounting receptacle 604. The dovetails 606, 608, 610, and 612 collectively form a sliding dovetail joint that allows the accessory mounting plate 602 to move laterally with respect to the mounting receptacle 604. Dotted lines are depicted that indicate movement of the accessory mounting plate 602 into the sliding dovetail joint. The accessory mounting plate 602 further includes a dovetail 614 which corresponds to a dovetail 616 of the mounting receptacle 604. When the accessory mounting plate 602 is inserted into the mounting receptacle 604 according to the sliding dovetail joint, the dovetail 614 engages the dovetail 616 and further lateral movement is inhibited in a direction corresponding to the dotted lines. At this point, the dovetails 606-616 collectively inhibit movement between the accessory mounting plate 602 and the mounting receptacle 604 in each direction except a lateral direction opposite the dotted lines. For instance, the dovetails 606-612 collectively inhibit movement along a vertical axis and a longitudinal axis, while the dovetails 614 and 616 collectively inhibit movement along a vertical axis and movement along a lateral axis in one direction.

Figure 7:
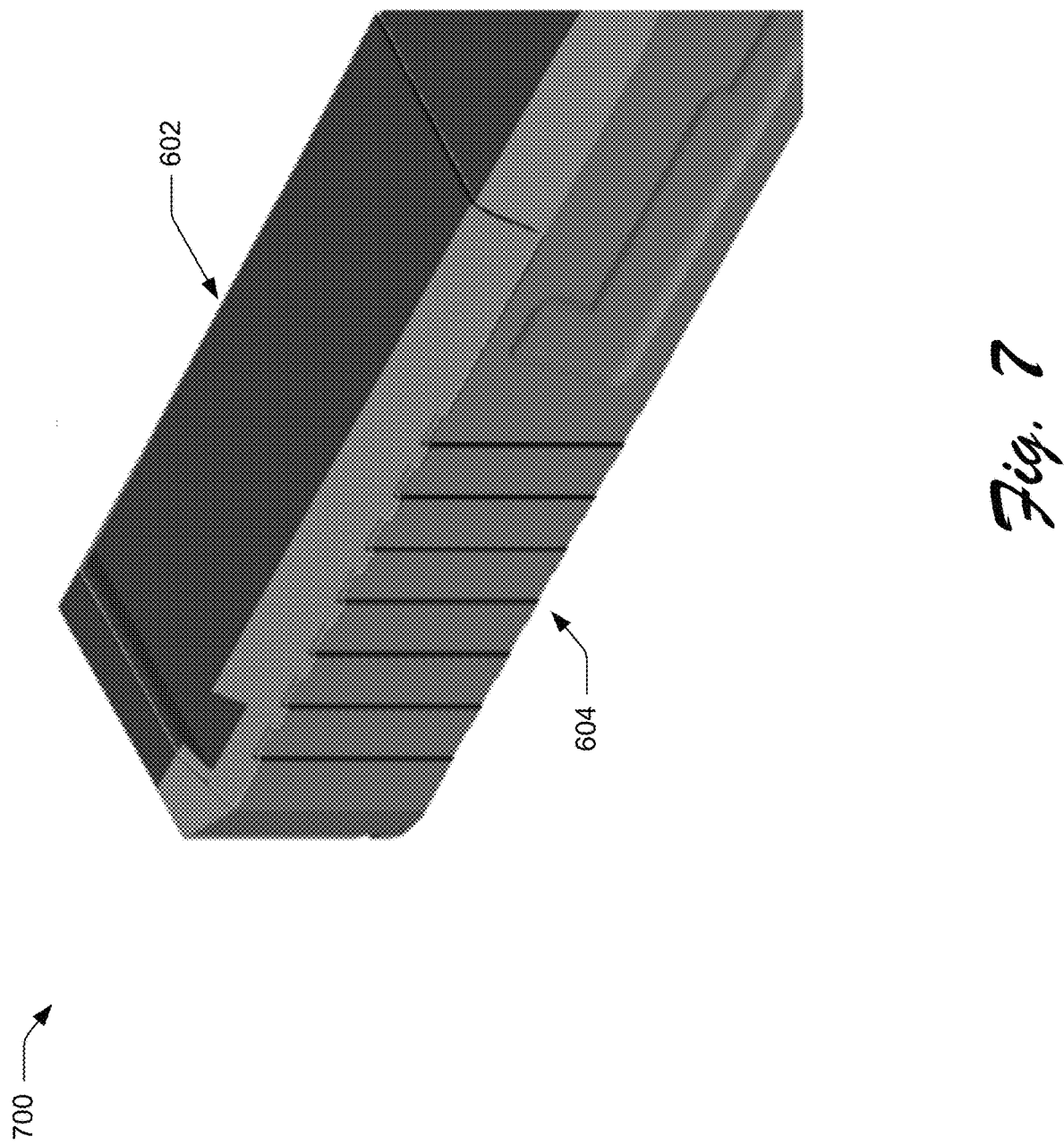
FIG. 7 depicts an example scenario in which an accessory mounting plate is inserted into a mounting receptacle.

FIG. 7 depicts an example scenario 700 in which the accessory mounting plate 602 is inserted into the mounting receptacle 604, and is an extension of the example scenario 600. The scenario 700 illustrates the accessory mounting plate 602 as positioned following the movement described with respect to FIG. 6, such as when the dovetails 606-616 are respectively engaged.

Figure 8:
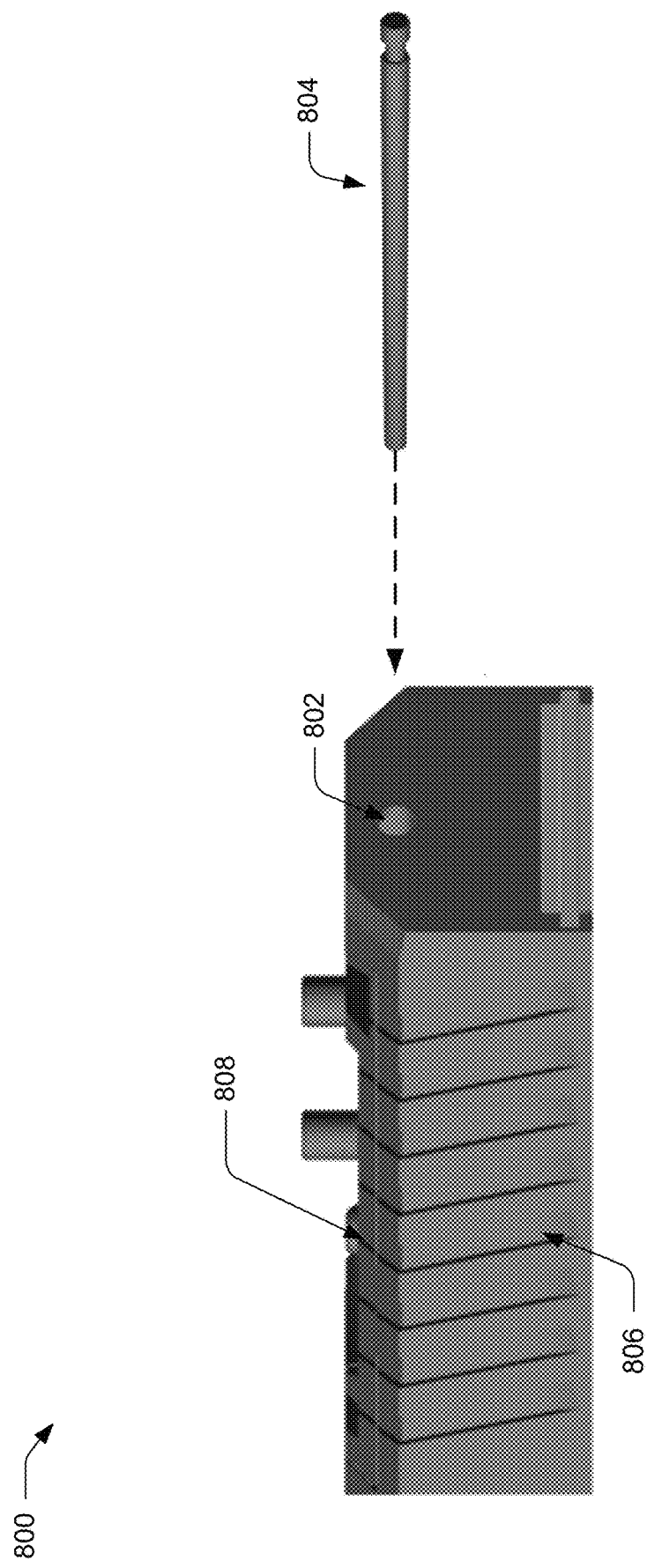
FIG. 8 depicts an example scenario in which an accessory mounting plate is screwlessly coupled with a mounting receptacle.

FIG. 8 depicts an example scenario 800 in which the accessory mounting plate 602 is removably and screwlessly coupled with the mounting receptacle 604, and is an extension of the example scenario 600. As illustrated in FIG. 6, the accessory mounting plate 602 includes a channel 618 and the mounting receptacle 604 includes a channel 620. Returning to FIG. 8, when the dovetails 606-616 are respectively engaged as described with respect to FIG. 6, the channels 618 and 620 are aligned to form a single channel 802. For instance, the channel 802 may correspond with the channel 408 as depicted in FIG. 5B. A pin 804 is inserted into the channel 802 to screwlessly couple the accessory mounting plate 602 with the mounting receptacle 604. The pin 804 inhibits movement of the channels 618 and 620 relative to one another along the lateral axis. In particular, the pin 804 inhibits movement of the accessory mounting plate 602 along the lateral axis in the direction opposite the dotted line depicted in FIG. 6. Thus, the pin 804 combined with the dovetails 606-616 collectively inhibit movement of the accessory mounting plate 602 relative to the mounting receptacle 604 in all directions, effectively locking the accessory mounting plate 602 in place. Neither the pin 804 nor any of the dovetails 606-616 involve screw mechanisms or clamp mechanisms. In this manner, the accessory mounting plate 602 is screwlessly coupled with the mounting receptacle 604 without the use of any tools, specialized equipment, or specialized skillsets.

In this example, the accessory mounting plate 602 is formed as a single piece of metal, such as through a process of milling. The outer dimensions of the accessory mounting plate 602 are configured to substantially match those of a recess in the mounting receptacle 604. This provides a generally uniform surface between the top of the accessory mounting plate 602 and the top of the mounting receptacle 604.

The accessory mounting plate 602 may include additional features to maintain consistency with the mounting receptacle 604. In this example, the mounting receptacle 604 includes a number of serrations 806 that provide an enhanced gripping surface for a user. The accessory mounting plate 602 additionally includes serrations 808 that correspond to and align with the serrations 806. This allows the accessory mounting plate 602 to provide a similar enhanced gripping surface as compared to a mounting receptacle that is not configured to receive an accessory mounting plate.

Figure 9A:
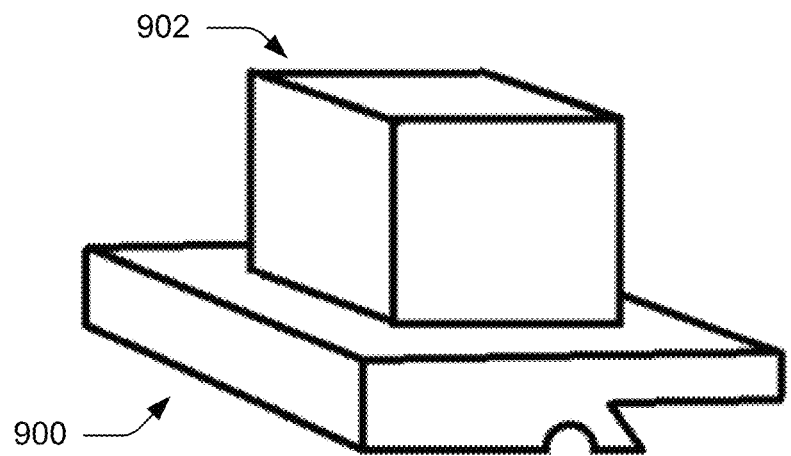
FIG. 9A depicts an accessory mounting plate at one stage of being screwlessly coupled with a mounting receptacle.
Figure 9B:
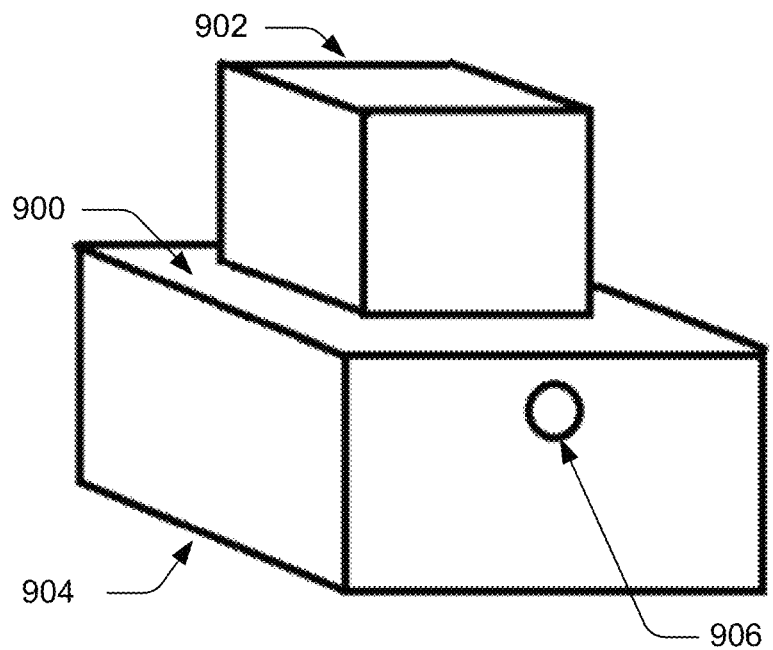
FIG. 9B depicts an accessory mounting plate at another stage of being screwlessly coupled with a mounting receptacle.

FIG. 9A depicts an accessory mounting plate 900 as coupled with an accessory 902. In this example, the accessory 902 is attached to mounting structures included on a top surface of the accessory mounting plate 900. FIG. 9B depicts the accessory mounting plate 900 as coupled with both the accessory 902 and a mounting receptacle 904. In this example, the dovetails of the accessory mounting plate 900 are engaged with the dovetails included in the mounting receptacle 904, and a pin has been inserted to occupy the channel 906. Thus, the accessory mounting plate 900 is screwlessly coupled with the mounting receptacle 904, and the accessory 902 is attached to the accessory mounting plate 900. In this manner, the accessory 902 is indirectly affixed to the mounting receptacle 904 such that the accessory 902 and the mounting receptacle 904 are in foxed positions relative to one another.

The following discussion describes example techniques for installation or removal of an accessory mounting plate. These techniques can be implemented in the example environment or with entities thereof, such as the accessory mounting plate 104 of FIG. 1 and the mounting receptacle 400 of FIG. 4. These techniques include a method illustrated in FIG. 10, which is shown as a set of operations or acts performed in association with installing or assembling the accessory mounting plate. Although described with reference to installation or assembly, operations or acts of this method may be implemented in an alternate or reverse order to implement techniques for uninstallation or disassembly of the accessory mounting plate. This and other methods described herein are not necessarily limited to the orders shown or listed for performing the operations. In this following discussion, reference may be made to the example environment or entities of FIGS. 1 through 9B by way of example. Such reference should not be taken as limiting the techniques to the environment, but illustrative of one of a variety of examples.

Figure 10:
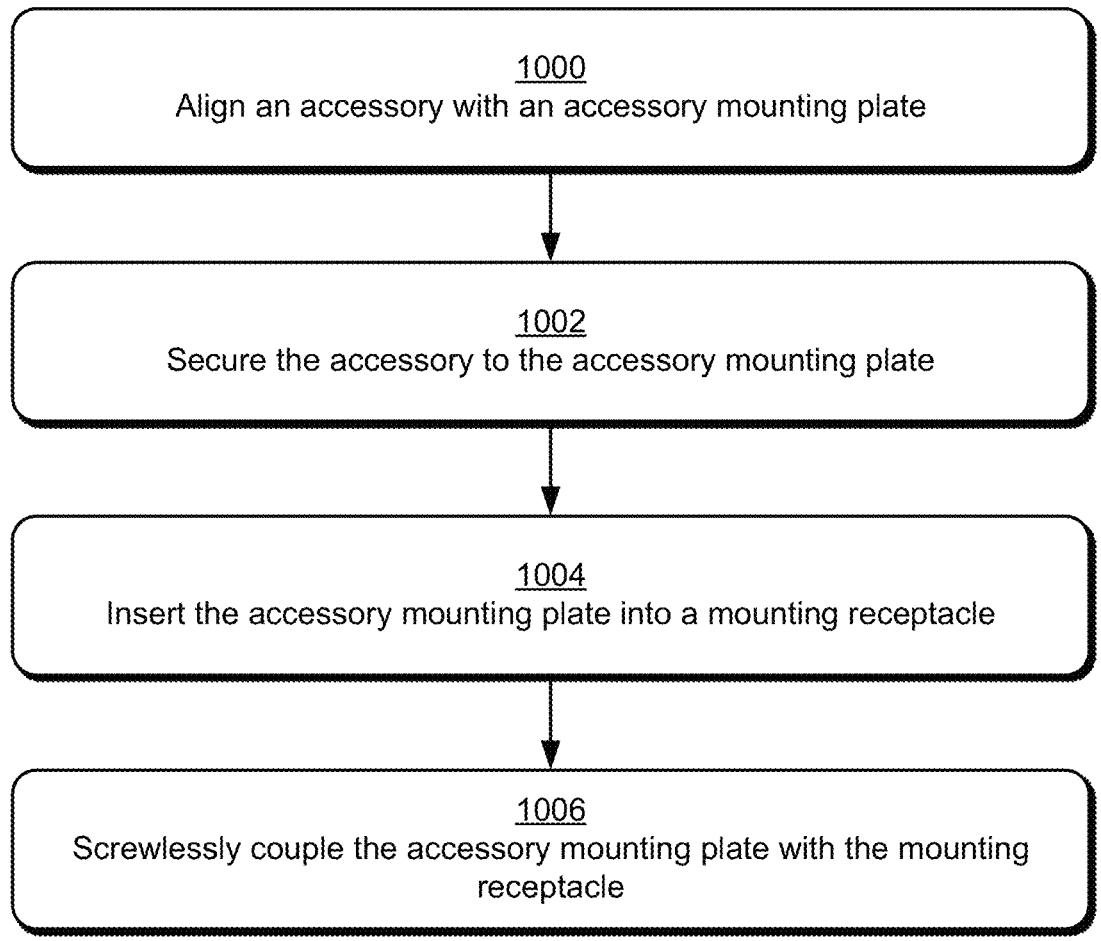
FIG. 10 depicts an example method for mounting an accessory to a mounting receptacle through use of an accessory mounting plate.

FIG. 10 depicts an example method for mounting an accessory to a mounting receptacle through use of an accessory mounting plate in accordance with one or more implementations.

At step 1000, an accessory is aligned with an accessory mounting plate. The accessory may be inserted into or onto a mounting structure portion of the accessory mounting plate that corresponds to a mounting portion of the accessory. At step 1002, the accessory is secured to the accessory mounting plate. This may include utilizing screws, pins, dovetails, or other attachment mechanisms, typically determined according to the design of a particular accessory. For example, an accessory may be secured to the accessory mounting plate 300 of FIG. 3A by sliding a dovetail portion of the accessory into the dovetailed channel 304 and inserting screws into the tapped holes 302 and corresponding holes in the accessory mounting plate. As another example, an accessory may be secured to the plate 306 of FIG. 3B by inserting a pin through the mounting system 310 and a corresponding channel in the accessory, and inserting screws into the tapped holes 308 and corresponding holes in the accessory mounting plate. As yet another example, an accessory may be secured to the accessory mounting plate 320 by sliding a dovetail portion of the accessory into the dovetailed channel 322 and inserting a screw or bolt, applying an adhesive such as an adhesive designed to prevent fasteners from loosening from vibration, or both.

At step 1004, the accessory mounting plate is inserted into the mounting receptacle. This includes moving the plate along a lateral axis to engage corresponding dovetails in the accessory mounting plate and the mounting receptacle to form a sliding dovetail joint. For example, the accessory mounting plate 602 of FIG. 6 is moved along a lateral axis to form a sliding dovetail joint that includes the dovetails 606-612. Once the sliding dovetail joint is formed, the accessory mounting plate is continually inserted along the lateral axis until movement is inhibited by an addition pair of corresponding dovetails of the accessory mounting plate and the mounting receptacle. For example, the accessory mounting plate 602 of FIG. 6 continues moving along the lateral axis until the dovetail 614 contacts the dovetail 616. At this point, the accessory mounting plate is completely inserted into the mounting receptacle.

At step 1006, the accessory mounting plate is screwlessly coupled with the mounting receptacle by inserting a pin into a channel corresponding to both the accessory mounting plate and the mounting receptacle. For instance, the channel may be a cavity formed by corresponding recesses in the accessory mounting plate and the mounting receptacle. As the channel is formed by recesses in both the accessory mounting plate and the mounting receptacle, the channel is not properly formed or aligned until the accessory mounting plate is completely inserted into the mounting receptacle in step 1004. When the pin is inserted into the channel, the pin inhibits movement of the accessory mounting plate along the lateral axis and prevents the accessory mounting plate from being removed from the mounting receptacle or otherwise leaving the position achieved in step 1004. The pin is simply placed in the channel without requiring any screws, adhesives, or tools. As the accessory mounting plate is coupled with the mounting receptacle through use of dovetails and a pin, they are screwlessly coupled together in a simple manner that does not require any tools or specialized skills.

In some implementations, the mounting receptacle includes a back plate that covers a rear portion of the mounting receptacle, e.g., covering the exposed portion of the channel in the rear of the mounting receptacle. In these implementations, the back plate may be simply removed to expose the channel and facilitate insertion of the pin. Once the pin is inserted in the channel, the back plate may be replaced, thereby securing the pin within the channel.

It is to be appreciated that the accessory does not need to be attached to the accessory mounting plate prior to coupling the accessory mounting plate with the mounting receptacle. For example, the accessory mounting plate may be inserted into the mounting receptacle (e.g, step 1004) and screwlessly coupled with the mounting receptacle (e.g., step 1006) prior to securing the accessory to the accessory mounting plate (e.g., step 1002).

Further, as different accessory mounting plates configured for different accessories are interchangeable, any number of accessory mounting plates may be attached to any number of accessories. Thus, to change the accessory attached to a mounting receptacle, a user may utilize the screwless coupling mechanisms of the accessory mounting plate to remove an existing accessory mounting plate and couple a different accessory mounting plate without changing the accessories attached to the accessory mounting plates. In this manner, a user may quickly and easily change the accessories attached to a mounting receptacle. Further, as no tools are necessary to perform this change, the techniques may be performed in the field rather than in a workshop setting as required by conventional techniques.

Coupling or decoupling an accessory mounting plate with a mounting receptacle does not affect an alignment or calibration of an accessory with respect to an accessory mounting plate. Thus, once an accessory is initially aligned or calibrated with respect to an accessory mounting plate, the accessory mounting plate may be coupled to or decoupled from a mounting receptacle without requiring additional alignment or calibration of the accessory. In this way, a user may maintain any number of aligned and calibrated accessories on respective accessory mounting plates and easily change which accessory is coupled to the mounting receptacle (via the accessory mounting plate) without requiring any additional alignment of the accessory.

Example implementation examples are described below.

In a first example, a retrofittable accessory mounting plate comprises: a main body; a screwless attachment aperture in the main body configured to enable the main body to be mounted to a mounting receptacle; and at least one dovetail structure on the main body configured to fictively engage the mounting receptacle.

In a second example, a retrofittable accessory mounting plate of example 1, wherein the at least one dovetail comprises at least a first dovetail and a second dovetail each configured to fictively engage the mounting receptacle, the first dovetail and the second dovetail being disposed substantially perpendicular to one another.

In a third example, the retrofittable accessory mounting plate of example 2, wherein the main body includes a bottom surface and the first dovetail is joined to the bottom surface of the main body.

In a fourth example, the accessory mounting plate of example 2 or 3, wherein the main body includes a top surface and the second dovetail is joined to the top surface of the main body.

In a fifth example, the accessory mounting plate of one of the examples 1 to 4, wherein the screwless attachment aperture defines a channel dimensioned to fictively engage a pin.

In a sixth example, the accessory mounting plate of example 5, wherein the channel is disposed on the bottom surface of the main body.

In a seventh example, the accessory mounting plate of one of examples 1 to 6, wherein the main body includes a mounting structure configured to enable an accessory to be mounted on the main body.

In an eighth example, the accessory mounting plate of example 7, wherein the structure is joined to the top surface of the main body.

In a ninth example, the accessory mounting plate of one of examples 1 to 8, wherein the bottom surface includes a plurality of fictive surfaces each of which is configured to fictively engage the mounting receptacle.

In a tenth example, a retrofittable accessory mounting plate comprising: a main body comprising: an upper surface having at least one structure configured to enable an accessory to be mounted thereon, and a first dovetail configured to engage with a first recess in a mounting receptacle; and a lower surface having a second dovetail configured to engage with a second recess in the mounting receptacle, and a channel configured to receive a pin for screwless coupling of the accessory mounting plate and the mounting receptacle.

In an eleventh example, the retrofittable accessory mounting plate of example 10, wherein the first dovetail and the second dovetail are substantially perpendicular to one another and are each configured to frictively engage the mounting receptacle.

In a twelfth example, the accessory mounting plate of example 10 or 11, wherein the channel is configured to frictively engage the pin to screwlessly inhibit movement of the first and second dovetails.

In a thirteenth example, the accessory mounting plate of one of examples 10 to 12, wherein the lower surface of the main body includes a plurality of fictive surfaces each configured to fictively engage the mounting receptacle.

In a fourteenth example, the accessory mounting plate one of examples 10 to 13, wherein the at least one structure includes a recess configured to engage with a dovetail of the accessory.

In a fifteenth example, the accessory mounting plate of one of examples 10 to 14, wherein the at least one structure includes a protrusion configured to engage with a recess in the accessory.

In a sixteenth example, the accessory mounting plate of one of examples 10 to 15, wherein the retrofittable accessory mounting plate is configured to be de-coupled from the receptacle while maintaining a placement of the accessory with respect to the retrofittable accessory mounting plate.

In a seventeenth example, a system comprising: a mounting receptacle including a mounting structure configured to enable an accessory mounting plate to be screwlessly mounted on the mounting receptacle, wherein the mounting structure includes a recess configured to engage with an accessory mounting plate dovetail, and a channel configured to receive a mounting pin to screwlessly mount the accessory mounting plate on the mounting receptacle; a plurality of screwlessly mountable accessory mounting plates, in particular according to one of the examples 1 to 16, each comprising: a dovetail configured to fictively engage the recess of the mounting receptacle; and a channel configured to receive the mounting pin; and a pin configured to screwlessly couple the mounting receptacle and a respective one of the accessory mounting plates by fictively engaging the channel of the mounting receptacle and the channel of the respective accessory mounting plate.

In an eighteenth example, the system of example 17, wherein each of the accessory mounting plates respectively supports use by a different accessory.

In a nineteenth example, the system of example 17 or 18, wherein a first accessory mounting plate of the plurality of accessory mounting plates includes a first structure configured to couple with a first accessory, and a second accessory mounting plate of the plurality of accessory mounting plates includes a second structure configured to couple with a second accessory.

In a twentieth example, the system of one of examples 17 to 19, further comprising an accessory configured to be coupled with the accessory mounting plate.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A retrofittable accessory mounting plate comprising:
a main body;
a screwless attachment aperture in the main body configured to enable the main body to be screwlessly mounted to a mounting receptacle, the screwless attachment aperture comprising a partial channel positioned within the main body to cooperatively form a channel with a partial channel in the mounting receptacle, wherein the main body is attachable to the mounting receptacle via a pin inserted into the formed channel; and
at least one dovetail structure on the main body configured to fictively engage the mounting receptacle, wherein the at least one dovetail structure is positioned substantially parallel to the partial channel positioned within the main body to define at least a portion of the partial channel within the main body, and insertion of the pin into the channel restricts movement of the main body relative to the mounting receptacle in a first direction, and fictive engagement of the dovetail structure with the mounting receptacle restricts movement of the main body relative to the mounting receptacle in a second direction.

2. The retrofittable accessory mounting plate of claim 1, wherein the main body further comprises a first dovetail and a second dovetail each configured to frictively engage a recess of the mounting receptacle such that with the first dovetail and second dovetail engaged with the recess the retrofittable accessory mounting plate does not protrude from edge bounds and top bounds of the recess, the first dovetail and the second dovetail being disposed substantially perpendicular to the at least one dovetail structure.

3. The retrofittable accessory mounting plate of claim 2, wherein the main body includes a bottom surface and a top surface, and wherein the at least one dovetail structure is joined to the bottom surface of the main body.

4. The retrofittable accessory mounting plate of claim 2, wherein the first dovetail is formed on a first edge of the main body, and the second dovetail is formed on a second edge of the main body opposite the first edge.

5. The retrofittable accessory mounting plate of claim 1, wherein the at least one dovetail structure defining at least a portion of the partial channel is disposed on a bottom surface of the main body.

6. The retrofittable accessory mounting plate of claim 1, wherein the main body further includes a mounting structure configured to enable a single accessory to be mounted on the main body.

7. The retrofittable accessory mounting plate of claim 6, wherein the mounting structure is joined to a top surface of the main body.

8. The retrofittable accessory mounting plate of claim 1, wherein a bottom surface of the main body includes a plurality of fictive surfaces each of which is configured to fictively engage the mounting receptacle.

9. A retrofittable accessory mounting plate comprising:
a main body comprising:
an upper surface having at least one structure configured to enable an accessory to be mounted thereon, and a first dovetail configured to engage with a first recess in a mounting receptacle such that with the first dovetail engaged with the first recess the retrofittable accessory mounting plate does not protrude from edge bounds and top bounds of the first recess; and
a lower surface having a second dovetail configured to engage with a second recess in the mounting receptacle, the second dovetail cooperatively forming a channel with the second recess in the mounting receptacle, the channel configured to receive a pin for screwless coupling of the accessory mounting plate and the mounting receptacle, and the second dovetail being substantially parallel with a longitudinal length of the channel.

10. The retrofittable accessory mounting plate of claim 9, wherein the first dovetail and the second dovetail are substantially perpendicular to one another and are each configured to fictively engage the mounting receptacle.

11. The retrofittable accessory mounting plate of claim 9, wherein the channel is configured to fictively engage the pin to screwlessly inhibit movement of the first and second dovetails in a first direction, and fictive engagement of the second dovetail with the mounting receptacle restricts the movement of the main body relative to the mounting receptacle in a second direction.

12. The retrofittable accessory mounting plate of claim 9, wherein the lower surface of the main body includes a plurality of frictive surfaces each configured to fictively engage the mounting receptacle.

13. The retrofittable accessory mounting plate of claim 9, wherein the at least one structure of the upper surface is configured to engage with the accessory.

14. The retrofittable accessory mounting plate of claim 9, wherein the at least one structure of the upper surface includes a protrusion configured to engage with the accessory.

15. The retrofittable accessory mounting plate of claim 9, wherein the retrofittable accessory mounting plate is configured to be de-coupled from the receptacle while maintaining a placement of the accessory with respect to the retrofittable accessory mounting plate.

16. A system comprising:
a mounting receptacle including a mounting structure configured to enable an accessory mounting plate to be screwlessly mounted on the mounting receptacle, wherein the mounting structure includes a recess configured to engage with an accessory mounting plate dovetail, and a channel configured to receive a mounting pin to screwlessly mount the accessory mounting plate on the mounting receptacle;
a mountable accessory mounting plate comprising:
at least one dovetail configured to fictively engage the recess of the mounting receptacle such that with the at least one dovetail engaged with the recess, the mountable accessory mounting plate does not protrude from edge bounds and top bounds of the recess; and
a channel formed at least in part by the at least one dovetail structure, the channel configured to receive the mounting pin; and
a pin configured to screwlessly couple the mounting receptacle and the mountable accessory mounting plate by fictively engaging the channel of the mounting receptacle and the channel of the respective accessory mounting plate.

17. The system of claim 16, further comprising a plurality of the mountable accessory mountain plates, wherein each of the mountable accessory mounting plates respectively supports use by a different accessory.

18. The system of claim 17, wherein a first accessory mounting plate of the plurality of accessory mounting plates includes a first structure configured to couple with a first accessory, and a second accessory mounting plate of the plurality of accessory mounting plates includes a second structure configured to couple with a second accessory.

19. The system of claim 16, further comprising an accessory configured to be coupled with the mountable accessory mounting plate.

20. The system of claim 16, wherein the mounting receptacle further includes an external surface defined by the edge bounds and the top bounds of the recess and disposed along different respective planes, and wherein with the at least one dovetail engaged with the recess, the mountable accessory mounting plate does not protrude through the respective different planes.

* * * * *